Feb. 24, 1948.   E. ARNOLD   2,436,415
ELECTRICAL TESTING APPARATUS
Filed Oct. 19, 1943   3 Sheets-Sheet 3
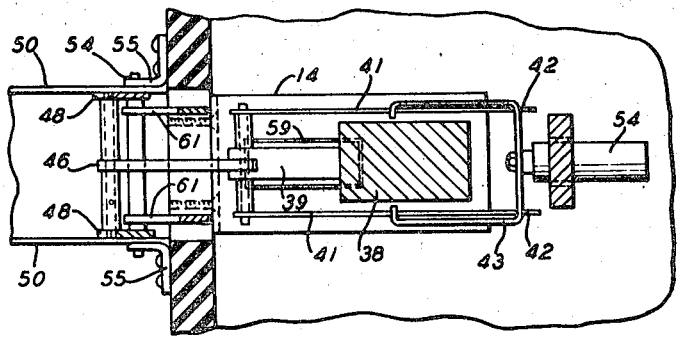
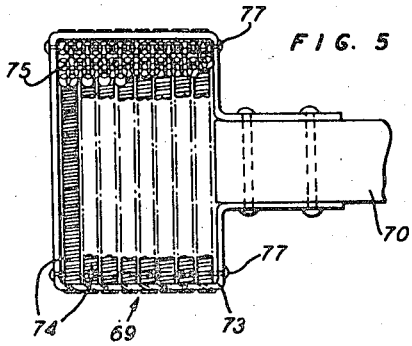
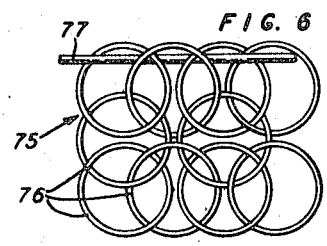
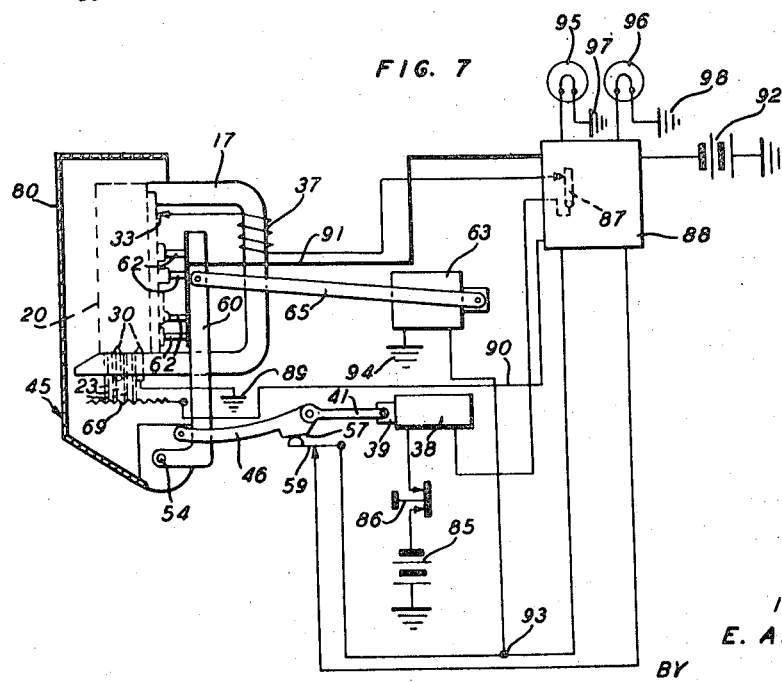
INVENTER
E. ARNOLD
BY
E. R. Nowlan
ATTORNEY Patented Feb. 24, 1948

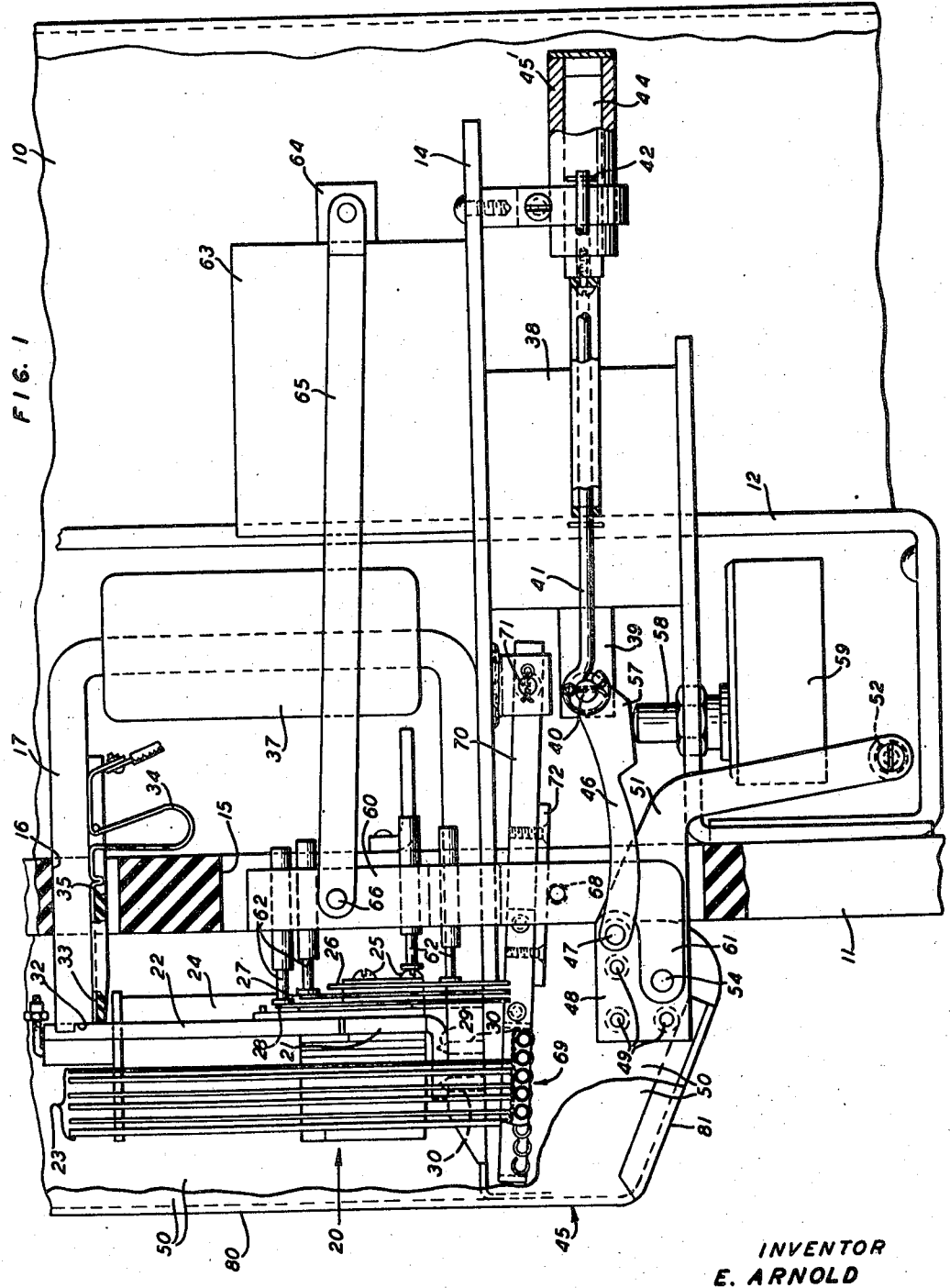

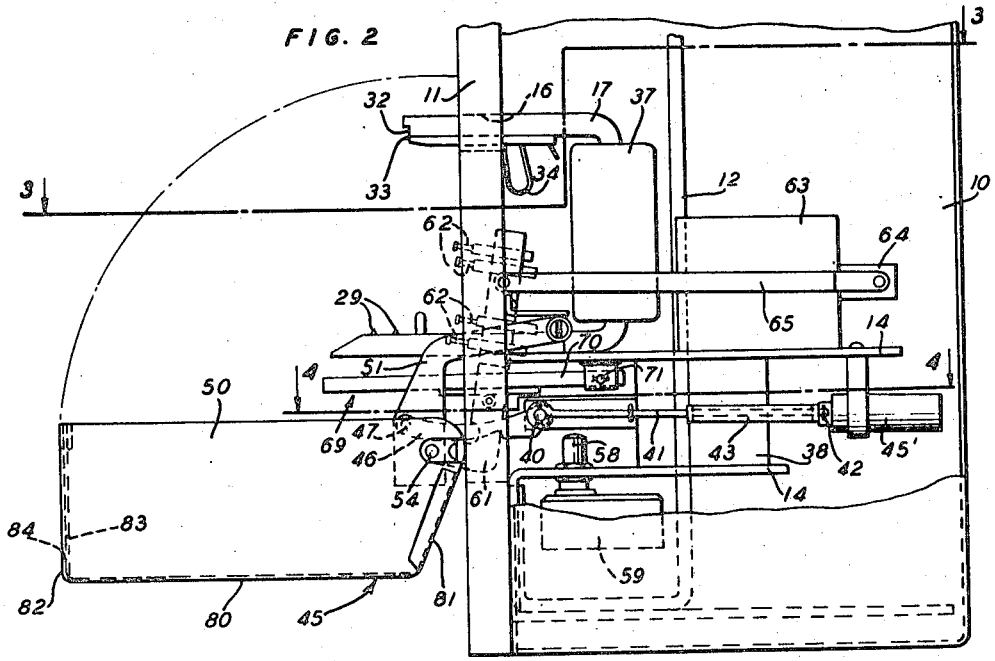
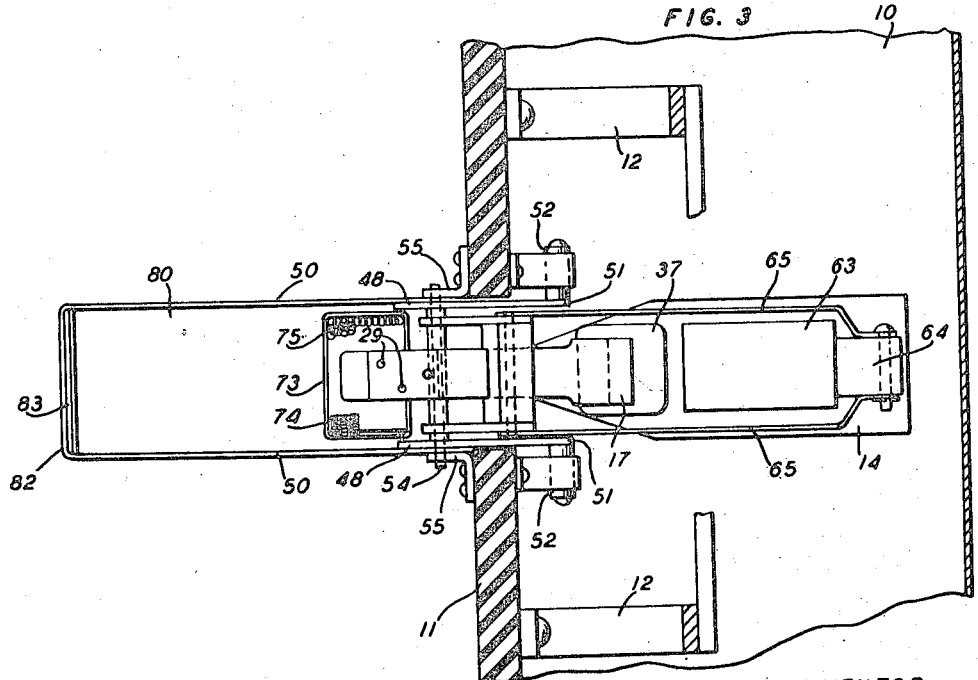

2,436,415

UNITED STATES PATENT OFFICE 2,436,415

ELECTRICAL TESTING APPARATUS

Edwin Arnold, Elizabeth, N. J., assignor to Western Electric Company, Incorporated, New York, N. Y., a corporation of New York Application October 19, 1943, Serial No. 506,847

7 Claims. (Cl. 175—183)

1

This invention relates to electrical testing apparatus and more particularly to apparatus for testing electrical relays for defects.

In the communication arts there are various types of relays performing numerous functions in the completion of electrical circuits, and it is important that such relays be tested for their efficiency prior to their installation in the communication equipment.

An object of the invention is to provide an apparatus for testing electrical articles which is highly efficient and automatic in its operation and encloses the article against personal contact therewith.

With this and other objects in view, the invention comprises a testing apparatus including an element to support an article to be tested and means affected by the location of the article in a testing position to cause actuation of means to position a cover over the article.

Other objects and advantages will be apparent from the following detailed description when considered in conjunction with the accompanying drawings, wherein Fig. 1 is a fragmentary vertical sectional view of the testing device showing the cover closed and the article in position for testing;

Fig. 2 is a fragmentary side elevational view of the apparatus shown with the cover in open position, portions of the apparatus in this view being broken away;

Fig. 3 is a horizontal sectional view taken substantially along the line 3—3 of Fig. 2;

Fig. 4 is a fragmentary sectional view taken along the line 4—4 of Fig. 2;

Fig. 5 is a top plan view of a contact unit of the apparatus, portions thereof being broken away;

Fig. 6 is a fragmentary detailed view of a portion of the structure shown in Fig. 5, and Fig. 7 is a simplified form of wiring diagram illustrating the invention.

Referring now to the drawings, attention is first directed to Figs. 1, 2 and 3, which illustrate a housing 10 which may be in the form of a metallic box, the front portion of which is covered with a panel 11 of a suitable insulating material. A bracket 12 of the contour shown and a lateral support 14 are disposed in the housing 10 and mounted in any desired manner, preferably to the panel 11. A large aperture 15 and a smaller aperture 16 are formed in the panel 11. A C-shaped core 17 of an electromagnet, which is to function in holding the article to be tested during the complete cycle of the testing apparatus, has its upper leg disposed in the aperture 16, its lower leg extending through the aperture 15 adjacent the center thereof. The lower leg of the core, in projecting from the housing 10 through the aperture 15 in the panel, provides a support for the article or electrical unit indicated generally at 20.

2

In the present instance the unit 20 is a relay designed for use in the communication arts, including a base or mounting member 21 to which an armature 22 is connected, the unit including also a plurality of outer contact springs 23, a coil 24, sets of connecting screws 25 and sets of back contacts 26, 27 and 28. Although there is shown but one set of the connecting screws 25 and back contacts 26, 27 and 28, it should be understood that there are two sets of each on the unit 20. Locating recesses 29 are disposed in the base member 21 and through the aid of locating pins 30 carried by lower leg of the core 17, the unit 20 may be accurately located upon the lower leg and be supported thereby. The upper leg of the core 17 is recessed, at 32, to receive and conform to the upper portion of the armature 22. It will, therefore, be apparent that when a magnetic current is created in the core 17, the unit 20 will be held in place. A resilient contact 33 normally projecting forwardly through the resiliency present in a loop portion 34 thereof but limited in its forward movement by a stop 35, is positioned for engagement electrically with the armature 22 when the unit is disposed in place. It will be noted that normally (Fig. 2) the contact 33 stops short of the outermost end of the said upper core leg to avoid closure of the circuit until the unit is in its proper position. The contact 33 is insulated from the core 17 in any suitable manner, such as by an insulated cover (not shown) for the core. A magnetic coil 37 for the core 17 is included in an electrical circuit, hereinafter described, which is controlled by the contact 33. Included in this same circuit is a solenoid 38 (Figs. 1, 2 and 4), core 39 of which supports a pin 40, the ends of which support rods 41. The rods 41 are connected, as at 42 (Fig. 4), to a bracket 43, the latter being fixed to a piston 44 in an air cylinder 45'. The purpose of the piston and cylinder connection with the solenoid core 39 is to serve as an air cushioning means during the closing of cover 45 and as a retarding means during the opening of the cover. During the latter a vacuum is created in the cylinder by the piston.

A link 46 has one end pivotally mounted upon the pin 40, the other end being pivotally mounted upon a pivot rod 47. The rod 47 is supported at spaced positions in brackets 48, which are fixed, as at 49, within the cover 45 to side walls 50 thereof. The brackets 48 extend inwardly through the aperture 15 in the panel 11, as indicated at 51, and downwardly when the cover is in closed position, where their lower ends carry weights 52 to serve in counterbalancing the cover 45. The cover 45, through the aid of the brackets 48, is mounted upon a pivot rod 54, which extends through the sides 50 of the cover and the brackets 48, as shown in Figs. 3 and 4, and has its ends disposed in bearing brackets 55 which are mounted upon the panel 11.

Returning now to the link 46, it will be noted that the enlarged inner portion thereof is provided with a cam surface 57 adapted in its movement to the right (Fig. 1), during movement of the cover into closed position, to engage a plunger 58 of a switch 59 for closing the switch.

An L-shaped supporting element 60 has its lower leg portion 61 mounted upon the pivot rod 54, and when the cover 45 is closed as illustrated in Fig. 1, the main portion of the element 60 is vertically disposed in the aperture 15. The element 60 carries two sets (only one being shown) of spring pressed terminals 62 adapted to form electrical engagement with both sets of the back contacts 26, 27 and 28 and one of each of the two sets of screws 25 for use in testing the unit 20. A solenoid 63, mounted upon the support 14, has a core 64 connected, through the aid of links 65, to the supporting element 60, as indicated at 66. Through this means the terminals 62 may be moved into and out of engagement with their respective contact and screw by movement of the supporting element about the pivot rod 54. A roller 68, carried by the supporting element 60, serves as means for moving a contact unit, indicated generally at 69, into and out of engagement with the lower ends of the front contact springs 23.

The unit 69 has a supporting arm 70, formed of a suitable insulating material, pivotally supported, at 71, and carrying a plate 72 positioned to ride upon the roller 68. The forward portion of the unit includes a substantially rectangular frame 73 which has a plurality of springs 74 extending longitudinally thereof, with their ends fixed to the end members of the frame. A mesh 75, formed of a multiplicity of interconnected rings 76, has its ends mounted upon rods 77 and is supported by the closely positioned springs 74. In actual structure the rings 76 are closely positioned to provide an impenetrable mass. Through this structure electrical engagement is made between the unit 69 and the front contact springs 23 of the unit 20.

Referring now to the cover 45, it will be observed that when disposed in the closed position shown in Fig. 1, the cover completely surrounds the unit 20 together with the projecting leg portions of the core 17, the open back of the cover being closed by the panel 11. The cover is, therefore, a hollow structure including a front portion 80, the sides 50, a bottom portion 81, and a top portion 82. A transparent plate 83 extends over an aperture 84 in the top portion 82 through which the operator may observe the unit during the testing operation.

Attention is now directed to the wiring diagram shown in Fig. 7. In this figure certain parts of the apparatus shown in the other figures are schematically illustrated. When the article or unit 20 is placed upon the core 17, with the cover 45 in the open position shown in Figs. 2, 3 and 4, a circuit is completed by the unit through its connection with the lower leg of the core or the pins 30 therein, if desired, and through its engagement with contact 33. This circuit may be traced from grounded battery 85 through a normally closed switch 86, solenoid 38, switch 87 of a testing unit 88, coil 37, contact 33, mechanical parts of the unit 20, such as the armature 22 and base 21, through the connected portion with the core 17 to ground 89. If desired, the ground 89 may be connected to the pins 30.

Upon completion of this circuit, the coil 37 is energized, to create a magnetic current in the core 17 to hold the unit 20 in place. The normally closed switch indicated at 87 in the testing unit 88 is included in the above mentioned circuit and is under the control of the testing unit to be opened thereby if all the tests on the unit 20 are completed without the location of any defects therein.

During the description of the circuit including the coil 37, it will be noted that this circuit included the solenoid 38. Through the energization of the solenoid 38, the cover 45 will be moved into its closed position, causing the cam surface 57 of the link 46 to close the switch 59 to complete a circuit through a testing unit 88. The details of the testing circuits and means in the unit 88 are not shown, as they are not considered specifically as a part of this invention but as a unit necessary to complete the understanding of the purposes and functions of the other parts. The contact unit 69, through the aid of a conductor 90, is under the control of the testing unit 88. A cable 91, connecting the testing unit 88 with the terminals 62, includes the terminals 62 under the control of the testing unit. Therefore, if the cover 45 is closed and the switch 59 is closed through the aid of the link 46, a circuit including grounded battery 92, which is to supply electrical energy for the testing unit 88, provides electrical energy for the solenoid 63, this circuit being traced from the grounded battery 92 through the testing unit 88, through connection 93, and through the solenoid 63 to ground at 94. Energization of the solenoid 63 through the links 65, causes movement of the element 60 about the pivot rod 54 to move the terminal 62 into electrical engagement with the respective parts such as the back contacts 26, 27 and 28 and one of the screws 25 of the unit 20.

In reviewing the structure of the apparatus, particularly the operation thereof, let it be assumed that the cover 45 is in the open position shown in Figs. 2 and 3. By placing the unit 20 upon the lower leg of the core 17, locating it by the aid of the pins 30 and causing it to engage the contact 33, the circuit through the coil 37, will be completed to cause the core to magnetically attract and hold the unit in place, energizing at the same time the solenoid 38 to cause the cover to move into the closed position. It should be understood that the energization of the coil 37 for holding the unit 20 and the energization of the solenoid 38 are simultaneous but the air cushion 44—45' slows the closing of the cover sufficiently to allow for the removal of the operator's hand. If the operator should be slow in removing his hand from the unit, the force applied to the cover to close it is not sufficient to cause injury. In the present embodiment the presence of the operator's hand in the path of the cover would prevent the cover from closing. The circuit controlled by the switch 59, however, would not be completed if the cover should be held against closing, as the cam surface 57 will not reach the plunger 58 to cause closing of the switch 59 until the cover is substantially in its closed position. Furthermore, the other circuits including the solenoid 63 are not completed until the cover is closed. When this has been accomplished, that is, when the switch 59 is closed and the solenoid 63 is energized, the element 60 is moved to electrically connect the terminals 62 with the unit 20, moving the unit 69 into the springs 23, after which the testing unit 88 may function. Connected with it and under its control are indicating or visual signals 95 and 96 provided with grounds 97 and 98 respectively to indicate when certain defects are present in the unit 20. Thus the operator need only place the unit 20 in the apparatus, and through this action the apparatus automatically functions until all of the tests have been completed, after which the switch 87 is opened, deenergizing the coil 37 and the solenoid 38, allowing the cover 45 to move into its open position. It will be noted that the major portion of the cover is in front of the pivot rod 54 and the weight of the cover is more than the weighted brackets 48 so that the cover will move without assistance into its open position. If the unit 20 should not pass all the tests, the switch 87 will not be opened. After the operator determines the nature of the defects through the aid of one or more signals 95 and/or 96, the switch 86 may be actuated to effect opening of the cover for the removal of the unit 20. The apparatus is otherwise fully automatic, requiring only the placing of an article or unit in place. The resiliency of the contact is sufficient to eject each article at the end of each operating cycle.

Although specific improvements of the invention have been shown and described, it will be understood that they are but illustrative and that various modifications may be made therein without departing from the scope and spirit of this invention as defined by the appended claims.

What is claimed is:

1. A testing apparatus comprising a support for an article to be tested, a cover for the article, means to support the cover for movement into a closed position, to cover the article on the support, and into an open position away from the support and article, electrically operable means adapted, when energized, to move the cover into its closed position, and means actuable by the article when disposed on the support to cause energization of the said operable means.

2. A testing apparatus comprising a support for an article to be tested, a cover for the article, means to support the cover for movement into a closed position, to cover the article on the support, and into an open position away from the support and article, an electromagnet adapted, when energized, to hold the article on the support, electrically operable means adapted, when energized, to move the cover into its closed position, and means actuable by the article when disposed on the support to cause energization of the electromagnet and the said operable means.

3. A testing apparatus comprising a support for an article to be tested, a cover for the article, means to support the cover for movement into a closed position, to cover the article on the support, and into an open position away from the support and article, an electromagnet adapted, when energized, to hold the article on the support, electrically operable means adapted, when energized, to move the cover into its closed position, an electrical circuit including a source of power to energize the electromagnet and the electrically operable means when the circuit is closed, and means for the closing of the circuit when the article is disposed on the support.

4. A testing apparatus comprising a support for an article to be tested, a cover for the article, means to support the cover for movement into a closed position, to cover the article on the support, and into an open position away from the support and article, an electromagnet adapted, when energized, to hold the article on the support, electrically operable means adapted, when energized, to move the cover into its closed position, an electrical circuit including a source of power to energize the electromagnet and the electrically operable means when the circuit is closed, and means rendered effective by the article when disposed in a position to be tested on the support to close the circuit.

5. A testing apparatus comprising a casing, an apertured panel substantially closing the casing, a support for an article to be tested, extending outwardly through the aperture in the panel, a hollow cover formed to cooperate with the panel when in its closed position adjacent the panel to house the article and the outer portion of the support, means to support the cover for movement thereof into its closed position and into an open position away from the support, electromagnetic means energizable to hold the article on the support, and operating means rendered effective by the article, when disposed in a position to be tested on the support, to cause movement of the cover into its closed position.

6. A testing apparatus comprising a casing, an apertured panel substantially closing the casing, a support for an article to be tested, extending outwardly through the aperture in the panel, a hollow cover formed to cooperate with the panel when in its closed position adjacent the panel to house the article and the outer portion of the support, means to support the cover for movement thereof into its closed position and into an open position away from the support, electromagnetic means energizable to hold the article on the support, means actuated by the article, when disposed in a position to be tested, to render the electromagnetic means effective, and operating means rendered effective by the article, when disposed in a position to be tested on the support, to cause movement of the cover into its closed position.

7. A testing apparatus comprising a casing, an apertured panel substantially closing the casing, a support for an article to be tested, extending outwardly through the aperture in the panel, a hollow cover formed to cooperate with the panel when in its closed position adjacent the panel to house the article and the outer portion of the support, means to support the cover for movement thereof into its closed position and into an open position away from the support, an electromagnet, disposed adjacent the support to hold the article in a position on the support to be tested, when energized, a contact positioned to be engaged by the article when in the said position, an electrical circuit, for the electromagnet including the contact, closed by the article when engaging the contact in the said position to cause energization of the electromagnet, and means to move the cover into its closed position.

EDWIN ARNOLD.

REFERENCES CITED

The following references are of record in the file of this patent:

UNITED STATES PATENTS

| Number | Name | Date |
| --- | --- | --- |
| 1,251,750 | Clausen | Jan. 1, 1918 |
| 1,305,865 | Arbogast | June 3, 1919 |
| 1,346,431 | Sokac et al. | July 13, 1920 |
| 1,506,761 | MacPherson | Sept. 2, 1924 |
| 2,340,837 | Meeker | Feb. 1, 1944 |
| 2,347,943 | Farmer et al. | May 2, 1944 |